(12) United States Patent
Kajiwara

(10) Patent No.: US 7,471,779 B2
(45) Date of Patent: Dec. 30, 2008

(54) COMMUNICATION CONTROL METHOD AND COMMUNICATION APPARATUS

(75) Inventor: Tomohito Kajiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 736 days.

(21) Appl. No.: 11/078,281

(22) Filed: Mar. 14, 2005

(65) Prior Publication Data

US 2005/0207547 A1 Sep. 22, 2005

(30) Foreign Application Priority Data

| Mar. 18, 2004 | (JP) | ............................. 2004-077602 |
| Jun. 23, 2004 | (JP) | ............................. 2004-184560 |

(51) Int. Cl.
*H04M 11/00* (2006.01)

(52) U.S. Cl. .............................. 379/100.01; 379/100.17

(58) Field of Classification Search ............ 379/100.01, 379/100.17; 358/400, 401, 434–436
See application file for complete search history.

(56) References Cited

U.S. PATENT DOCUMENTS

| 7,002,972 | B1* | 2/2006 | Endo ........................... 370/401 |
| 2001/0040702 | A1* | 11/2001 | Leung .................... 379/100.17 |
| 2004/0001221 | A1* | 1/2004 | McCallum .................. 358/468 |
| 2004/0184110 | A1* | 9/2004 | Maei et al. .................. 358/400 |
| 2005/0207547 | A1 | 9/2005 | Kajiwara |
| 2006/0126605 | A1 | 6/2006 | Kajiwara |

FOREIGN PATENT DOCUMENTS

| JP | 2001-292267 | 10/2001 |
| JP | 2001-309112 | 11/2001 |
| JP | 2002-374386 | 12/2002 |
| JP | 2003-125152 | 4/2003 |
| JP | 2004-32039 | 1/2004 |

* cited by examiner

*Primary Examiner*—Stella L Woo
(74) *Attorney, Agent, or Firm*—Oblon, Spivak, McClelland, Maier & Neustadt, P.C.

(57) ABSTRACT

A communication apparatus is adapted to carry out a real-time network facsimile communication with an other party's apparatus via a packet network based on ITU-T Recommendations T.38. The communication apparatus is provided with an attribute information acquiring part to acquire other party's attribute information that indicates an attribute of the other party's apparatus, from a call connection message that is exchanged with the other party's apparatus in a predetermined call connection procedure carried out prior to a start of the real-time network facsimile communication, and a communication control part to control the real-time network facsimile communication depending on contents of the other party's attribute information acquired by the attribute information acquiring part.

20 Claims, 16 Drawing Sheets

FIG.4

TABLE 5a

| MANAGEMENT NO. | OTHER PARTY'S ATTRIBUTE INFO | | | COMMUNICATION CONTROL PARAMETERS | | | |
|---|---|---|---|---|---|---|---|
| | MANUFACTURER ID INFO | MODEL ID INFO | VERSION ID INFO | PACKET SENDING INTERVAL | SENDING PACKET LENGTH | SENDING PACKET TYPE | PREAMBLE PACKET ADDITION |
| 0 (STANDARD) | — | — | — | 10 msec | 1500 Bytes | DIS (RECEIVING END) DCS (SENDING END) | ADD |
| 1 | A | 001 | (UNRELATED) | 50 msec | 250 Bytes | NSF/DIS (RECEIVING END) NSS (SENDING END) | DO NOT ADD |
| 2 | A | 002 | PRIOR TO V2.0 | 40 msec | (STANDARD) | (STANDARD) | (STANDARD) |
| 3 | B | (UNRELATED) | (UNRELATED) | (STANDARD) | (STANDARD) | (STANDARD) | DO NOT ADD |
| ... | ... | ... | ... | ... | ... | ... | ... |

FIG.11

| OPTIONAL ATTRIBUTE FIELD NAME | CHARACTER STRING WRITTEN IN ATTRIBUTE FIELD | CORRESPONDING VALUE THAT IS SET |
|---|---|---|
| T35Country Code | 「T35CountryCode」 | 0~255 |
| T35Extension | 「T35Extension」 | 0~255 |
| Manufacturer Code | 「ManufacturerCode」 | 0~65535 |

FIG.12

⋮ a=CountryCode:0
a=T35Extension:0
a=ManufacturerCode:37

| OPTIONAL ATTRIBUTE FIELD NAME | CHARACTER STRING WRITTEN IN ATTRIBUTE FIELD | CORRESPONDING VALUE THAT IS SET | |
|---|---|---|---|
| | | MEANING OF VALUE | RANGE OF VALUE |
| Vendor | 「Vendor」 | t35country-code | 0~255 |
| | | t35extension | 0~255 |
| | | manufacturer-code | 0~65535 |

COMMUNICATION CONTROL METHOD AND COMMUNICATION APPARATUS

BACKGROUND OF THE INVENTION

1. Field of the Invention

The present invention generally relates to communication control methods and communication apparatuses, and more particularly to a communication control method for controlling a real-time network facsimile communication based on ITU-T Recommendations T.38 between a communication apparatus and another apparatus via a packet network, and to a communication apparatus which employs such a communication control method.

2. Description of the Related Art

The ITU-T Recommendations T.38 for exchanging packetized T.30 signals in a packet network were established in April 1999. By utilizing this T.38 communication technique, it has become possible to make a capacity exchange between terminals via the packet network and to guarantee real-time communication.

Various manufacturers have developed communication apparatuses in conformance with the ITU-T Recommendations T.38 by interpreting the Recommendations T.38. Ideally, if the communication apparatuses are in conformance with the Recommendations T.38, it should be possible to positively carry out communications among the communication apparatuses, regardless of the manufacturers of the communication apparatuses.

However, in actual real-time network facsimile communications, there were problems in the mutual connection of the communication apparatuses depending on the various attributes of the communication apparatuses. That is, the communication is carried out correctly in some cases but not in other cases, depending on the attribute of the communication apparatus of the other party (at the other end), for example, such as the manufacturer, the model and the version of the communication control program of the communication apparatus of the other party.

Ideally, each manufacturer should develop the communication apparatus conforming to the ITU-T Recommendations T.38 by strictly interpreting the Recommendations T.38, and confirm the mutual connection with communication apparatuses manufactured by other manufacturers, so that the above described problem in the mutual connection can be prevented. But in actual practice, such measures are difficult to achieve.

A Japanese Laid-Open Patent Application No.2001-309112 proposes a network facsimile apparatus which varies the amount of data to be transmitted to another apparatus which is of the other party and is in conformance with the Recommendations T.38 for carrying out a real-time network facsimile communication via a packet network, depending on the terminal type, that is, whether the other apparatus is a packet network direct correction type real-time network facsimile apparatus (IAF: Internet Aware Fax) or a gate way apparatus which relays a real-time facsimile communication between a G3 facsimile apparatus in a telephone network and the network facsimile apparatus.

But since the technique proposed in the Japanese Laid-Open Patent Application No.2001-309112 simply varies the amount of data to be transmitted depending on the terminal type, it is impossible to flexibly cope with the delicate differences that actually exist in the other apparatus of the other party during the control operation of the real-time network facsimile communication of the other apparatus, caused by the attribute of the other apparatus, such as the manufacturer, the model and the version of the communication control program of the other apparatus. As a result, there was a problem in that the certainty of the real-time network facsimile communication via the packet network is insufficient.

SUMMARY OF THE INVENTION

Accordingly, it is a general object of the present invention to provide a novel and useful communication apparatus and a communication control method, in which the problems described above are suppressed.

Another and more specific object of the present invention is to provide a communication apparatus and a communication control method, which can flexibly cope with the delicate differences that actually exist in the other apparatus of the other party during the control operation of the real-time network facsimile communication of the other apparatus, caused by the attribute of the other apparatus, such as the manufacturer, the model and the version of the communication control program of the other apparatus, and positively carry out the real-time network facsimile communication via the packet network.

Still another and more specific object of the present invention is to provide a communication apparatus for carrying out a real-time network facsimile communication with an other party's apparatus via a packet network based on ITU-T Recommendations T.38, comprising an attribute information acquiring part configured to acquire other party's attribute information that indicates an attribute of the other party's apparatus, from a call connection message that is exchanged with the other party's apparatus in a predetermined call connection procedure carried out prior to a start of the real-time network facsimile communication; and a communication control part configured to control the real-time network facsimile communication depending on contents of the other party's attribute information acquired by the attribute information acquiring part. According to the communication apparatus of the present invention, it is possible to flexibly cope with the delicate differences that actually exist in the other party's apparatus during the control operation of the real-time network facsimile communication of the other party's apparatus, caused by the attribute of the other party's apparatus, such as the manufacturer, the model and the version of the communication control program of the other party's apparatus, and positively carry out the real-time network facsimile communication via the packet network.

A further object of the present invention is to provide a communication control method for controlling a communication apparatus which carries out a real-time network facsimile communication with an other party's apparatus via a packet network based on ITU-T Recommendations T.38, where the communication method comprises an attribute information acquiring step acquiring other party's attribute information that indicates an attribute of the other party's apparatus, from a call connection message that is exchanged with the other party's apparatus in a predetermined call connection procedure carried out prior to a start of the real-time network facsimile communication; and a communication control step controlling the real-time network facsimile communication depending on contents of the other party's attribute information acquired by the attribute information acquiring step. According to the communication control method of the present invention, it is possible to flexibly cope with the delicate differences that actually exist in the other party's apparatus during the control operation of the real-time network facsimile communication of the other party's apparatus, caused by the attribute of the other party's apparatus, such as the manufacturer, the model and the version of the communication control program of the other party's apparatus, and positively carry out the real-time network facsimile communication via the packet network.

Other objects and further features of the present invention will be apparent from the following detailed description when read in conjunction with the accompanying drawings.

BRIEF DESCRIPTION OF THE DRAWINGS

FIG. 4 is a diagram showing a table of other party's attribute information and communication control parameters;

FIG. 11 is a diagram showing a field group for representing the attribute information and the like of the apparatus by an SDP description within an SIP message;

FIG. 12 is a diagram showing a description of fields in SDP within the SIP message, for the case shown in FIG. 11;

FIG. 13 is a diagram showing another field group for representing the attribute information and the like of the apparatus by the SDP description within the SIP message;

DESCRIPTION OF THE PREFERRED EMBODIMENTS

Figure 1:
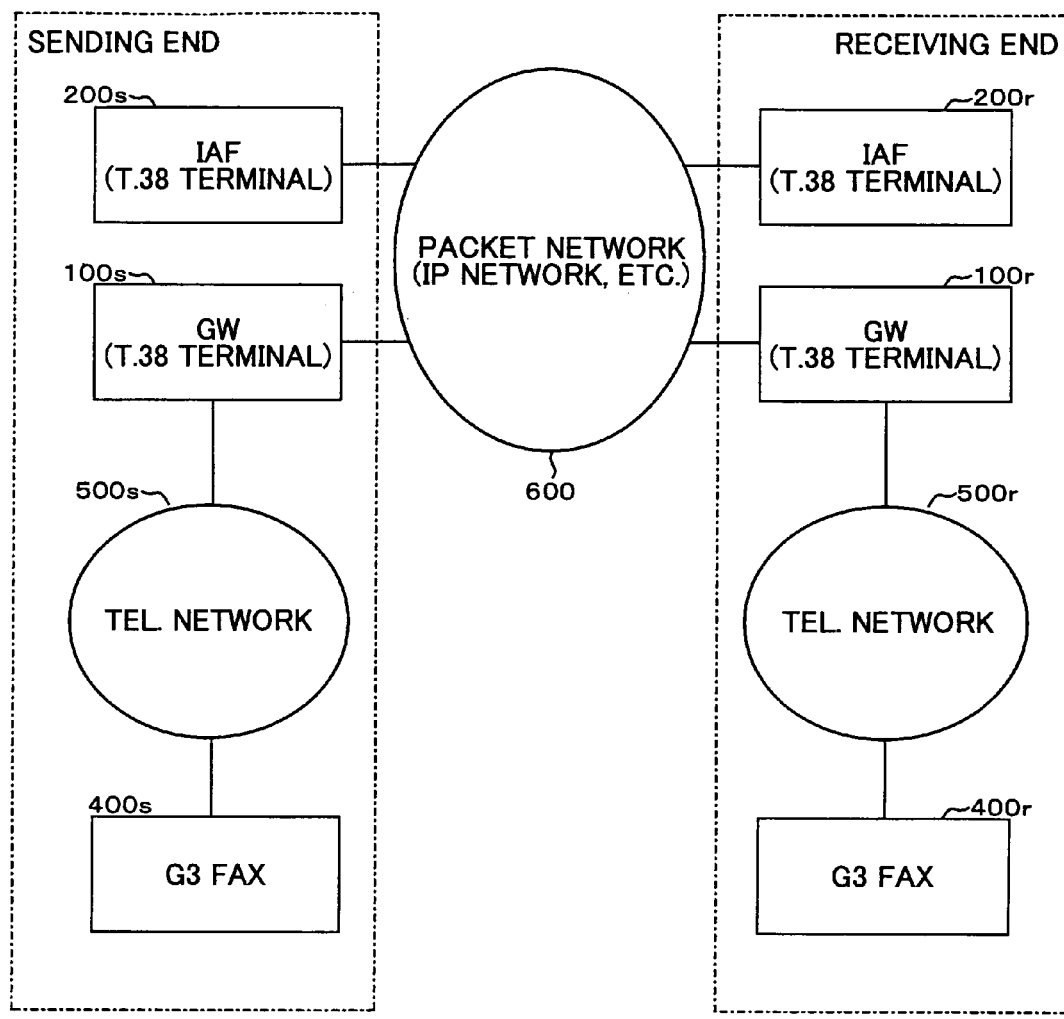
FIG. 1 is a system block diagram showing a structure of a real-time network facsimile communication system to which an embodiment of a communication apparatus according to the present invention is applied.

A description will be given of various embodiments of a communication apparatus according to the present invention and a communication control method according to the present invention, by referring to the drawings.

FIG. 1 is a system block diagram showing a structure of a real-time network facsimile communication system to which an embodiment of the communication apparatus according to the present invention is applied. A communication apparatus 1 of this embodiment is in conformance with the ITU-T Recommendations T.38, and employs an embodiment of the communication control method according to the present invention.

In FIG. 1, an Internet Aware Fax (IAF) $200s$ which can operate as a T.38 terminal in a packet network 600 such as an IP network typified by the Internet or, a Gate Way (GW, or gate way apparatus) $100s$ for a G3 facsimile apparatus $400s$ in a telephone network $500s$, may function as a sending T.38 terminal.

On the other hand, an IAF $200r$ which can operate as a T.38 terminal in the packet network 600 or, a GW $100r$ for a G3 facsimile apparatus $400r$ in a telephone network $500r$, may function as a receiving T.38 terminal.

Figure 2:
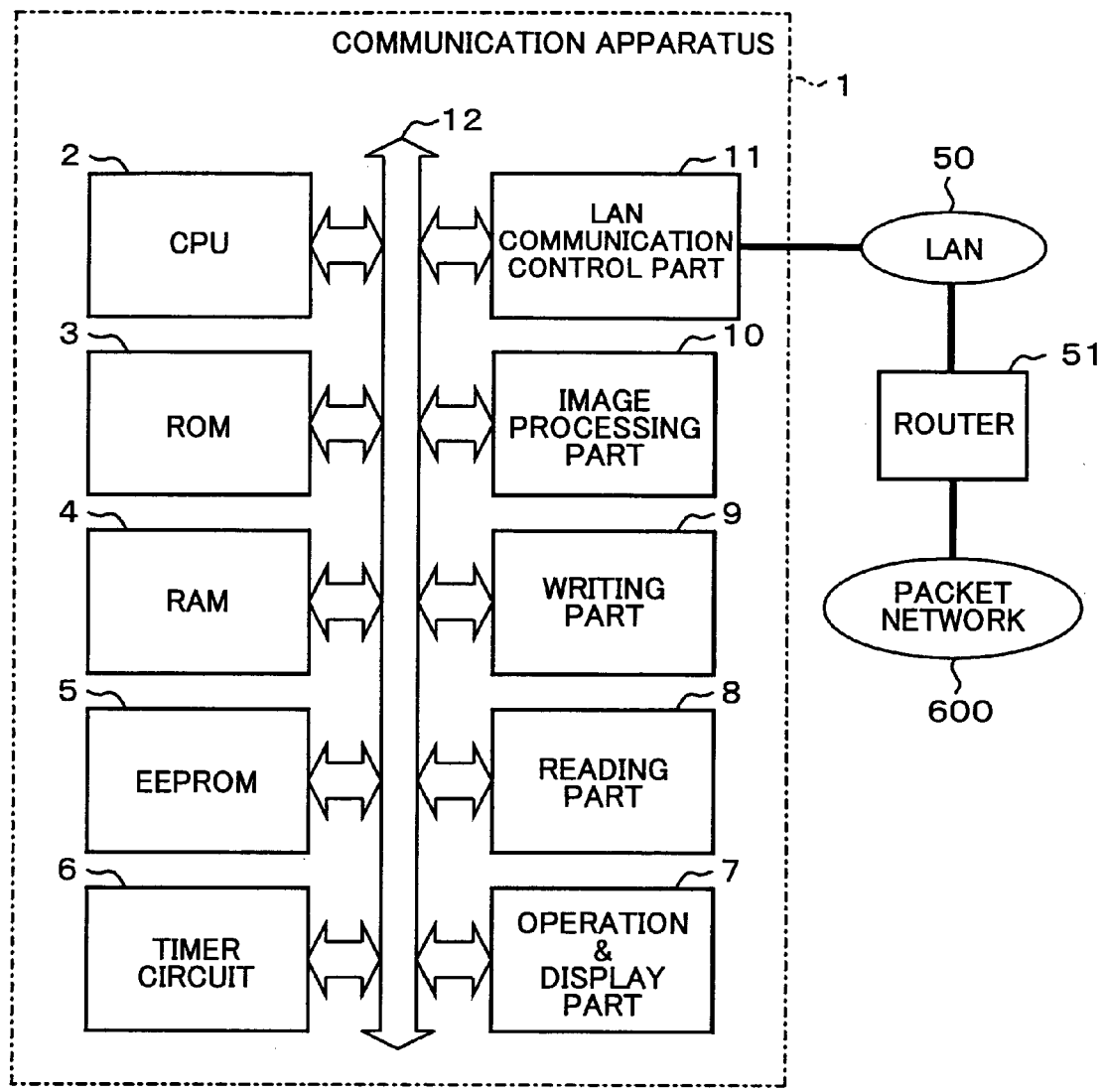
FIG. 2 is a system block diagram showing a structure of the communication apparatus.

The IAF type T.38 terminal functions as the sending IAF $200s$ shown in FIG. 1 or, the receiving IAF terminal $200r$ shown in FIG. 2, depending on the phase or stage of the real-time network facsimile communication.

When the IAF type T.38 terminal functions as the sending IAF $200s$, a real-time network facsimile communication is made with the receiving T.38 terminal that is connected to the packet network 600, namely, the IAF $200r$ or the GW $100r$ (the receiving G3 facsimile apparatus $400r$ via the GW $100r$).

On the other hand, when the IAF type T.38 terminal functions as the receiving IAF $200r$, a real-time network facsimile communication is made with the sending T.38 terminal that is connected to the packet network 600, namely, the IAF $200s$ or the GW $100s$ (the receiving G3 facsimile apparatus $400s$ via the GW $100s$).

The GW type T.38 terminal functions as the sending GW $100s$ shown in FIG. 1 or, the receiving GW $100r$ shown in FIG. 1, depending on the phase or stage of the relay operation of the real-time network facsimile communication.

When the GW type T.38 terminal functions as the sending GW $100s$, a real-time network facsimile communication with the receiving T.38 terminal that is connected to the packet network 600, namely, the IAF $200r$ or the GW $100r$ (the receiving G3 facsimile apparatus $400r$ via the GW $100r$) is relayed.

On the other hand, when the GW type T.38 terminal functions as the receiving GW $100r$, a real-time network facsimile communication with the sending T.38 terminal that is connected to the packet network 600, namely, the IAF $200s$ or the GW $100s$ (the receiving G3 facsimile apparatus $400s$ via the GW $100s$) is relayed.

FIG. 2 is a system block diagram showing a structure of the communication apparatus 1.

The communication apparatus 1 shown in FIG. 2 is an IAF type T.38 terminal. The communication apparatus 1 is connected to the packet network 600 via a LAN 50 and a router 51. The communication apparatus 1 includes a Central Processing Unit (CPU) 2, a Read Only Memory (ROM) 3, a Random Access Memory (RAM) 4, an Electrically Erasable Programmable ROM (EEPROM) 5, a timer circuit 6, an operation and display part 7, a reading part 8, a writing part 9, an image processing part 10 and a Local Area Network (LAN) communication control part 11 that are connected via a system bus 12.

The CPU 2 uses the RAM 4 as a work region, and carries out processes such as controlling various parts of the communication apparatus 1 based on control programs stored in the ROM 3, processing various data, and carrying out protocol control. The ROM 3 stores the control programs that are executed by the CPU 2 to control various parts of the communication apparatus 1, and the various data required to control font data corresponding to each character code and the like. The RAM 4 provides the work region for the CPU 2, as described above.

The EEPROM 5 stores various information required for the operation of the communication apparatus 1. The stored contents of the EEPROM 5 is maintained even when the power supply of the communication apparatus 1 is turned OFF. The EEPROM 5 may be replaced by a Static RAM (SRAM) having a battery backup or, a magnetic disk drive, for example.

The timer circuit 6 measures the time and constantly keeps the present date and time. The CPU 2 can know the present time (date and time) by reading the present time from the timer circuit 6 via the system bus 14.

The operation and display part 7 includes an input part having various keys which are operated by the user to input information, and a display part for displaying the operating state of the communication apparatus 1 and various messages with respect to the user. The display part may be formed by a Liquid Crystal Display (LCD). The input part and the display part may be provided separately or, integrally. For example, a touch panel integrally having the input part and the display part may be used for the operation and display part 7.

The reading part 8 reads a document that is set, and obtains document image data of the read document. The writing part 9 writes image data on a recording medium. For example, the writing part 9 prints the image data on recording paper.

The image processing part 10 carries out various image processing with respect to the image data treated in the communication apparatus 1. The various image processing includes encoding or compressing process to encode or compress raw image data, decoding or expanding process to decode the encoded data or expand the compressed data, binarizing process, magnification (or zoom) process, reduce and enlarge process, image correction process, adding process to add information such as character string information related to a sending date and time and a receiving date and time, and the like.

The LAN communication control part 11 is formed by the so-called Network Interface Card (NIC), and is connected to the Ethernet LAN 50. Through the exchange of the TCP/IP protocol in the Ethernet protocol, the LAN communication control part 11 can exchange with another apparatus various data related to the real-time network facsimile communication and the like based on the ITU-T Recommendations T.38 in a higher layer. The LAN 50 is connected to the packet network 600 via the router 51, so that a network communication of the communication apparatus 1 is possible via the packet network 600.

The system bus 12 is made up of signal lines that are formed by a data bus, an address bus, a control bus, an interrupt signal line and the like for exchanging data among the parts of the communication apparatus 1.

If the communication apparatus 1 is to function as the GW type T.38 terminal, the communication apparatus 1 is additionally provided with a network control unit that connects to the telephone network 500 and a G3 facsimile modem, so as to provide a real-time mutual conversion function between transmission signals such as control signals and image data based on the ITU-T Recommendations T.30 exchanged by modem signals via the telephone network 500, and T.38 packets exchanged via the packet network 600.

Figure 3:
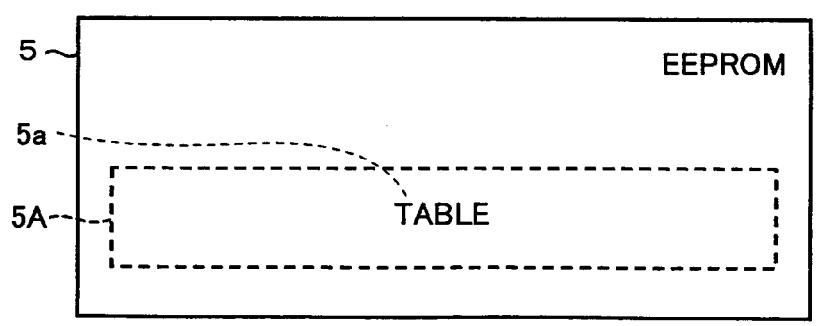
FIG. 3 is a diagram showing stored contents of an EEPROM 5 of the communication apparatus shown in FIG. 2.

FIG. 3 is a diagram showing stored contents of the EEPROM 5 of the communication apparatus 1 shown in FIG. 2.

As shown in FIG. 3, the EEPROM 5 includes a storage region 5A, and a table 5*a* of other party's attribute information and communication control parameters. The other party's attribute information that is related to the attribute of the other apparatus of the other party, and the communication control parameters that are to be applied correspondingly, are set and prestored in correspondence with each other in the table 5*a*. The table 5*a* is referred to when carrying out a communication control process which will be described later.

FIG. 4 is a diagram showing the table 5*a* of the other party's attribute information and communication control parameters. The table 5*a* shown in FIG. 4 is a collection of records formed by an "other party's attribute information" field and a "communication control parameter" field that are provided for each "management number".

The "other party's attribute information" field is formed by three subfields, namely, a "manufacturer identification information" subfield for identifying the manufacturer of the other party's apparatus, a "model identification information" subfield for identifying the model of the other party's apparatus, and a "version identification information" subfield for identifying the version of the control program related to the real-time network facsimile communication of the other party's apparatus.

On the other hand, the "communication control parameter" field is formed by four subfields, namely, a "packet sending interval" subfield for indicating a waiting time from a time when a packet related to the real-time network facsimile communication is sent until a next packet is set, a "sending packet length" subfield for indicating an upper limit length of the packet in units of bytes when sending the packet related to the real-time network facsimile communication, a "sending packet type" subfield for indicating the type of sending packet when exchanging the packet of the control signal related to the capacity exchange between the sending end and the receiving end, and a "preamble packet addition" subfield for indicating whether or not to add a packet of a preamble (preamble packet) prior to the packet of the control signal related to the real-time network facsimile communication. The "sending packet type" includes a first type and a second type. According to the first type, a digital identification signal DIS is sent when the communication apparatus 1 functions as a receiving end and a digital send command signal is sent when the communication apparatus 1 functions as a sending end. On the other hand, according to the second type, a nonstandard function identification signal NSF or the digital identification signal DIS is sent when the communication apparatus 1 functions as a receiving end, and a nonstandard function setting signal NSS is sent when the communication apparatus 1 functions as a sending end.

The "sending packet type" may also indicate whether the data exchange is to be made by the UDP or TCP packet. In this case, the packet exchange in the real-time network facsimile communication between the communication apparatus 1 and the other party's apparatus can be made using a packet type that is even more suited for the communication, that is, using the UDP or TCP packet. For this reason, it is possible to improve the certainty of the real-time network facsimile communication between the communication apparatus 1 and the other party's apparatus, In the table 5*a*, the records for the "management number" that is "0" are special records in which the standard communication control parameters are set with respect to another party's apparatus other than the other party's apparatus that is specifically registered in each record for the "management number" greater than or equal to "1".

In the records for the "management number" that is "0 (standard)", the "other party's attribute information" field has no meaning, and only the "communication control parameter" field has meaning. In the particular case shown in FIG. 4, the "packet sending interval" subfield is "10 msec", the "sending packet length" subfield is "1500 bytes", the "sending packet type" subfield is "DIS (receiving end) and DCS (sending end)", and the "preamble packet addition" subfield is "add" for the "communication control parameter" field corresponding to the "management number" that is "0".

In the "other party's attribute information" field corresponding to the "management number" that is "1", the "manufacturer identification information" subfield is "A", the "model identification information" subfield is "001", and the "version identification information" subfield is "(unrelated)". In other words, in the real-time network facsimile communication with the other party's apparatus having the "manufacturer identification information" that is "A" and the "model identification information" that is "001", the communication control is carried out based on the corresponding "communication control parameters" regardless of the "version identification information". Hence, the "packet sending interval" is "50 msec" which is longer than standard, the "sending packet length" is "250 bytes" which is shorter than standard, the "sending packet type" is "NSF/DIS (receiving end) and NSS (sending end)" which is different from standard, and the "preamble packet addition" is "not add" which is different from standard.

The "communication control parameter" field corresponding to each "other party's attribute information" field is set similarly in the other records for the "management number" that is "2" or greater. In each subfield of the "communication control parameter" field, "(standard)" indicates that a reference is to be made to the set value (or information) in the corresponding subfield of the standard record for the "management number" that is "0".

Hence, in the table 5a, it is possible to preset optimum communication control parameters for the attribute information of each other party's apparatus specified by each "other party's attribute information". For this reason, it is possible to flexibly cope with the delicate differences that actually exist in each other party's apparatus during the control operation of the real-time network facsimile communication of the other party's apparatus, caused by the attribute of the other party's apparatus, such as the manufacturer, the model and the version of the communication control program of the other party's apparatus, and positively carry out the real-time network facsimile communication via the packet network 600.

Figure 5:
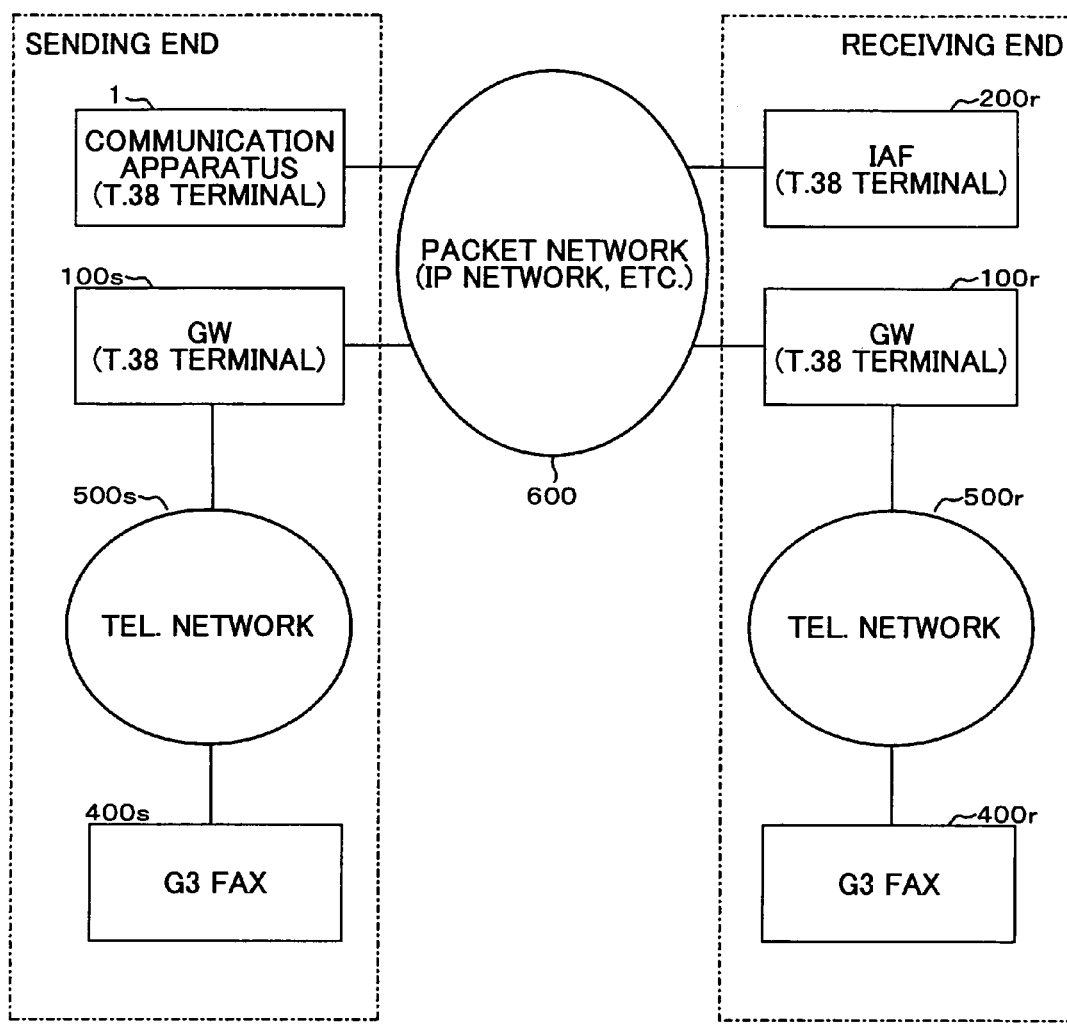
FIG. 5 is a system block diagram showing a structure of a communication system in which an embodiment of the communication apparatus is applied to a sending IAF shown in FIG. 1 and a real-time network facsimile communication is to be made with a receiving facsimile apparatus in a telephone network via a receiving gate way.

Next, a description will be given of the communication control operation of the communication apparatus 1 of this embodiment for a case shown in FIG. 5 where the communication apparatus 1 is applied to the sending IAF 200s shown in FIG. 1 and the real-time network facsimile communication is to be made with the receiving facsimile apparatus 400r in the telephone network 500r via the receiving GW 100r. FIG. 5 is a system block diagram showing a structure of a communication system in which this embodiment of the communication apparatus 1 is applied to the sending IAF 200s shown in FIG. 1 and the real-time network facsimile communication is to be made with the receiving facsimile apparatus 400r in the telephone network 500r via the receiving GW 100r. In FIG. 5, those parts which are the same as those corresponding parts in FIG. 1 are designated by the same reference numerals, and a description thereof will be omitted.

Figure 6A:
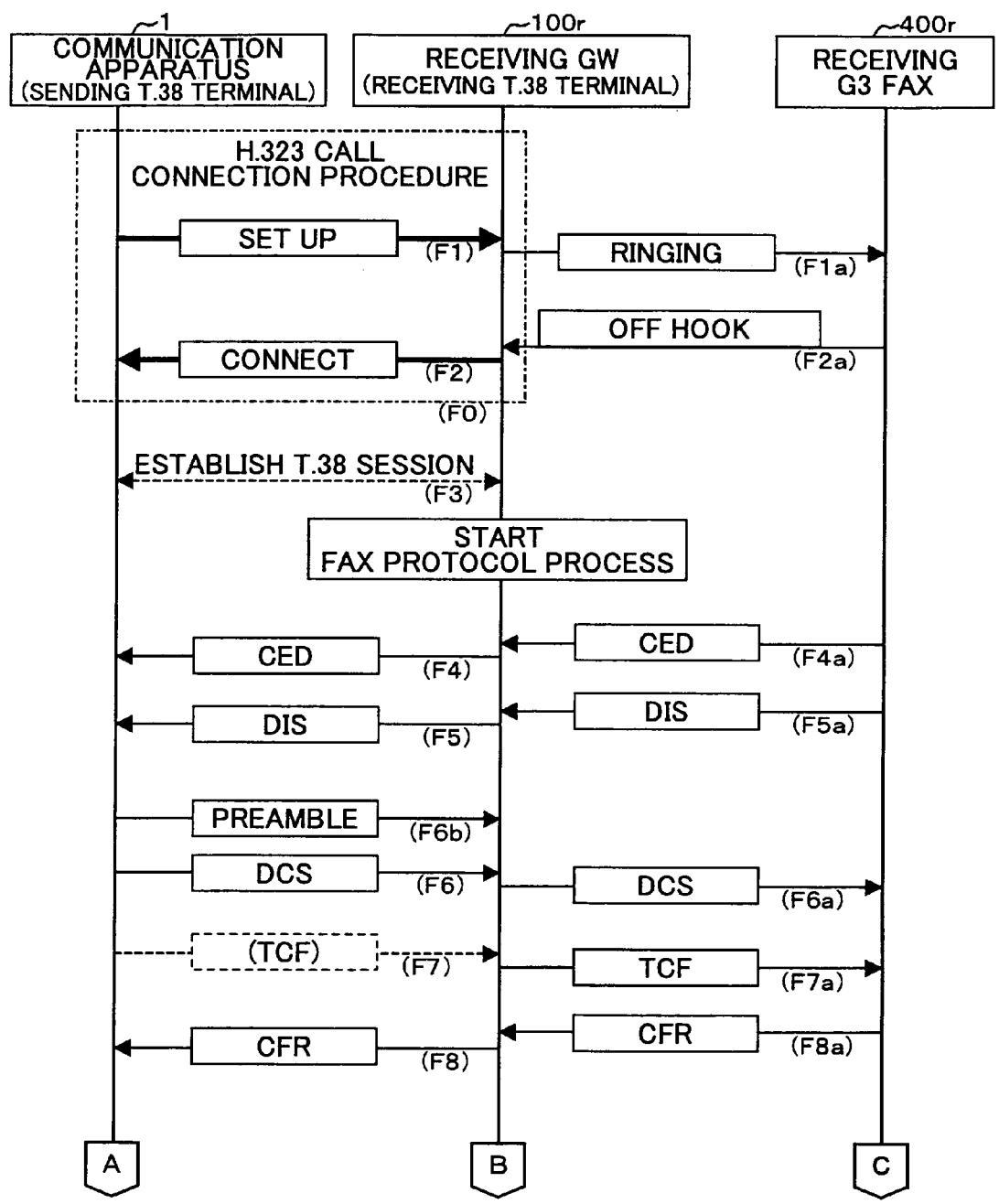
FIGS. 6A and 6B are sequence diagrams respectively showing a communication sequence for the case shown in FIG. 5 where the communication apparatus is applied to the sending IAF shown in FIG. 1 and the real-time network facsimile communication is to be made with the receiving facsimile apparatus in the telephone network via the receiving gate way.
Figure 6B:
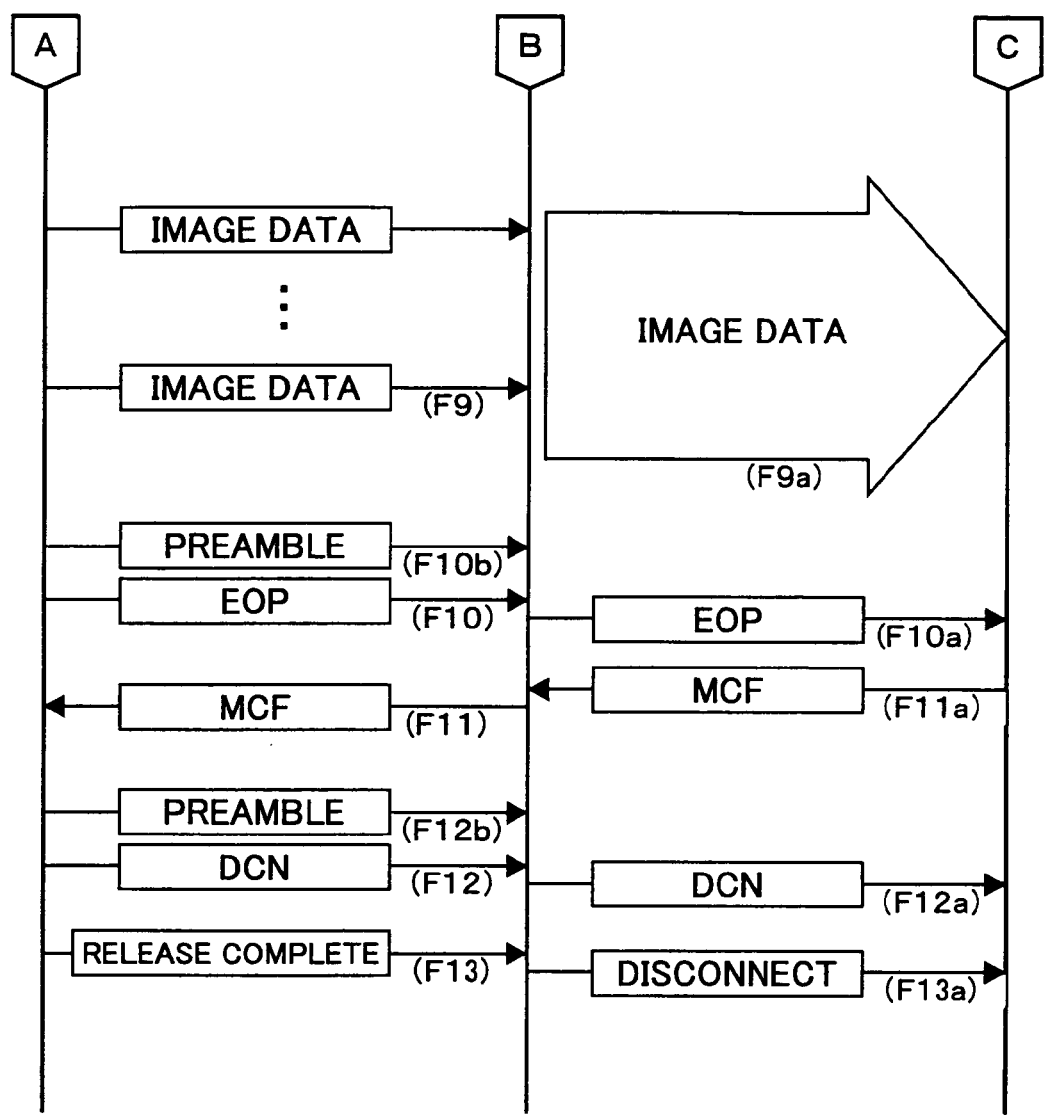

FIGS. 6A and 6B are sequence diagrams respectively showing a communication sequence for the case shown in FIG. 5 where the communication apparatus 1 is applied to the sending IAF 200s shown in FIG. 1 and the real-time network facsimile communication is to be made with the receiving facsimile apparatus 400r in the telephone network 500r via the receiving GW 100r.

First, in FIG. 6A, the communication apparatus 1 which functions as the sending T.38 terminal sends a "SETUP" message based on the H.323 procedure, with respect to the GW 100r which functions as the receiving T.38 terminal (phase F1). In response to the "SETUP" message, the GW 100r rings the receiving G3 facsimile apparatus 400r via the telephone network 500r (phase F1a). When a response is made from the receiving facsimile apparatus 400r by an off hook (phase F2a), the receiving GW 100r sends a "CONNECT" message based on the H.323 procedure with respect to the sending communication apparatus 1 (phase F2). The phases F1 and F2 form the H.323 call connection procedure (phase F0).

By this H.323 call connection procedure, the T.38 session is established between the sending communication apparatus 1 and the receiving GW 100r. The G3 facsimile communication that is established between the receiving GW 100r and the receiving G3 facsimile apparatus 400r is not directly related to the sending communication apparatus 1. However, the control signals and data based on the ITU-T Recommendations T.30 that are exchanged between the receiving GW 100r and the receiving G3 facsimile apparatus 400r and the packets are mutually converted in real-time, so that the sending communication apparatus 1 and the receiving G3 facsimile apparatus 400r indirectly carry out the real-time facsimile communication.

In other words, a called station identification signal CED which is sent from the receiving G3 facsimile apparatus 400r as the modem signal (phase F4a) is converted into CED packets by the receiving GW 100r and sent to the sending communication apparatus 1 (phase F4). In addition, when a digital identification signal DIS is sent from the receiving G3 facsimile apparatus 400r as the modem signal following the called station identification signal CED (phase F5a), the receiving GW 100r converts the digital identification signal DIS into DIS packets and sends the DIS packets to the sending communication apparatus 1 (phase F5).

On the other hand, the sending communication apparatus 1 sends at least one packet of the digital send command signal DCS (DCS packet) which is one of the control signals (phase F6). Prior to sending the DCS packet, the sending communication apparatus 1 sends at least one preamble packet to the receiving GW 100r (phase F6b). According to the T.30 communication procedure using the modem signal via the telephone network, the preamble signal is actually send prior to sending each control signal. But according to the real-time network facsimile communication based on T.38 in the packet network, it is meaningless to exchange the digital data corresponding to the preamble signal, and thus, a packet containing information which simply indicates that "this packet is a preamble packet" is sent as the preamble packet. The preamble packet may also be added to the DIS packets and the like that are sent from the receiving GW 100r to the sending communication apparatus 1.

The DCS packets sent in the phase F6 are converted into the modem signal by the receiving GW 100r and sent to the receiving G3 facsimile apparatus 400r (phase F6a).

In addition, the sending communication apparatus 1 sends at least one packet of a training check signal TCF (TCF packet) following the DIS packets to the receiving GW 100r (phase F7). A packet containing information which simply indicates that "this packet is a TCF packet" may be sent as the TCF packet. Since it is meaningless to exchange the digital data corresponding to the training check signal TCF in the packet communication, the sending of the training check signal TCF may be omitted.

After sending the digital send command signal DCS in the phase F6a, the receiving GW 100r sends the training check signal TCF to the receiving G3 facsimile apparatus 400r (phase F7a). The receiving G3 facsimile apparatus 400r trains the modem thereof based on the training check signal TCF that is received in the phase F7a, and sends a reception preparation confirmation signal CFR to the receiving GW 100r when the training is completed (phase F8a). Responsive to the reception preparation confirmation signal CFR, the receiving GW 100r sends at least one packet of the reception preparation confirmation signal CFR (CFR packet) to the sending communication apparatus 1 (phase F8).

The pre-transmission procedure prior to the start of sending of the image data is completed by the phases shown in FIG. 6A described above, and the communication sequence advances to the phases shown in FIG. 6B. The packets of the image data are successively sent from the sending communication apparatus 1 to the receiving GW 100r (phase F9). The receiving GW 100r converts the packets of the image data successively received from the sending communication apparatus 1 into the signals of the image data in conformance with Recommendations T.30, and sends the signals of the image data to the receiving G3 facsimile apparatus 400r (phase F9a).

When the sending of the image data is completed, the sending communication apparatus 1 sends at least one packet of an end of procedure signal EOP (EOP packet) to the receiving GW 100r (phase F10). Prior to sending the EOP packet, the sending communication apparatus 1 sends at least one preamble packet to the receiving GW 100r (phase F10b). When the receiving GW 100r receives the EOP packet in the phase F10, the receiving GW 100r sends a modem signal of the end of procedure signal EOP to the receiving G3 facsimile apparatus 400r (phase F10a). In addition, when the receiving GW 100r receives a modem signal of a message confirmation signal MCF from the receiving G3 facsimile apparatus 400r (phase F11a), the receiving GW 100r sends at least one packet of the message confirmation signal MCF (MCF packet) to the sending communication apparatus 1 (phase F11).

When the sending communication apparatus 1 receives the MCF packet in the phase F11, the sending communication apparatus 1 sends at least one packet of a disconnect command signal DCN (DCN packet) to the receiving GW 100r (phase F12). Prior to sending the DCN packet, the sending communication apparatus 1 sends at least one preamble packet to the receiving GW 100r (phase F12b). When the receiving GW 100r receives the DCN packet in the phase F12, the receiving GW 100r sends a modem signal of the disconnect command signal DCN to the receiving G3 facsimile apparatus 400r (phase F12a).

Finally, the sending communication apparatus 1 sends a "Release Complete" message to the receiving GW 100r (phase F13). In response to the "Release Complete" message from the sending communication apparatus 1, the receiving GW 100r disconnects the line connected between the receiving GW 100r and the receiving G3 facsimile apparatus 400r (phase F13a), and the relay operation of the real-time network facsimile communication is completed.

In the communication sequence described above with reference to FIGS. 6A and 6B, the exchange of the packets related to the real-time network facsimile communication between the communication apparatus 1 which functions as the sending T.38 terminal and the GW 100r which functions as the receiving T.38 terminal is made based on the ITU-T Recommendations T.38. However, the interpretation of the ITU-T Recommendations T.38 by the manufacturer of the GW 100r and the interpretation of the ITU-T Recommendations T.38 by the manufacturer of the communication apparatus 1 may be slightly different. As a result, when the standard real-time network facsimile communication is controlled by referring to the standard communication control parameters corresponding to the "management number" that is "0" in the table 5a shown in FIG. 4 at the communication apparatus 1 which functions as the sending T.38 terminal, it may not be possible to carry out a normal communication with the GW 100r which functions as the receiving T.38 terminal due to such slight differences in the interpretations of the ITU-T Recommendations T.38 and various other causes.

Such a problem is not limited to the case shown in FIG. 5 where the communication apparatus 1 is used as the sending IAF 200s, and similar problems occur in cases where the communication apparatus 1 is used as the sending GW 100s in FIG. 1, used as the receiving IAF 200r in FIG. 1, and used as the receiving GW 100r in FIG. 1.

More particularly, such problems occur when the packet sending interval of the communication apparatus is too short for the other party's apparatus to cope with, when the preamble packet sent from the communication apparatus cannot be processed correctly in the other party's apparatus, when the size of the packet sent from the communication apparatus is too large for the other party's apparatus to process the packet in a normal manner, and when it is not possible to determine whether the exchange of the DIS and DSC or the exchange of the NSF or DIS and NSS is the appropriate packet type for the sending packet.

Accordingly, this embodiment carries out an optimum control of the real-time network facsimile communication by utilizing the attribute information of the other party's apparatus that may be included, as information of the call connection message, in the "SETUP" message or the "CONNECT" message of the call connection procedure.

Figure 7:
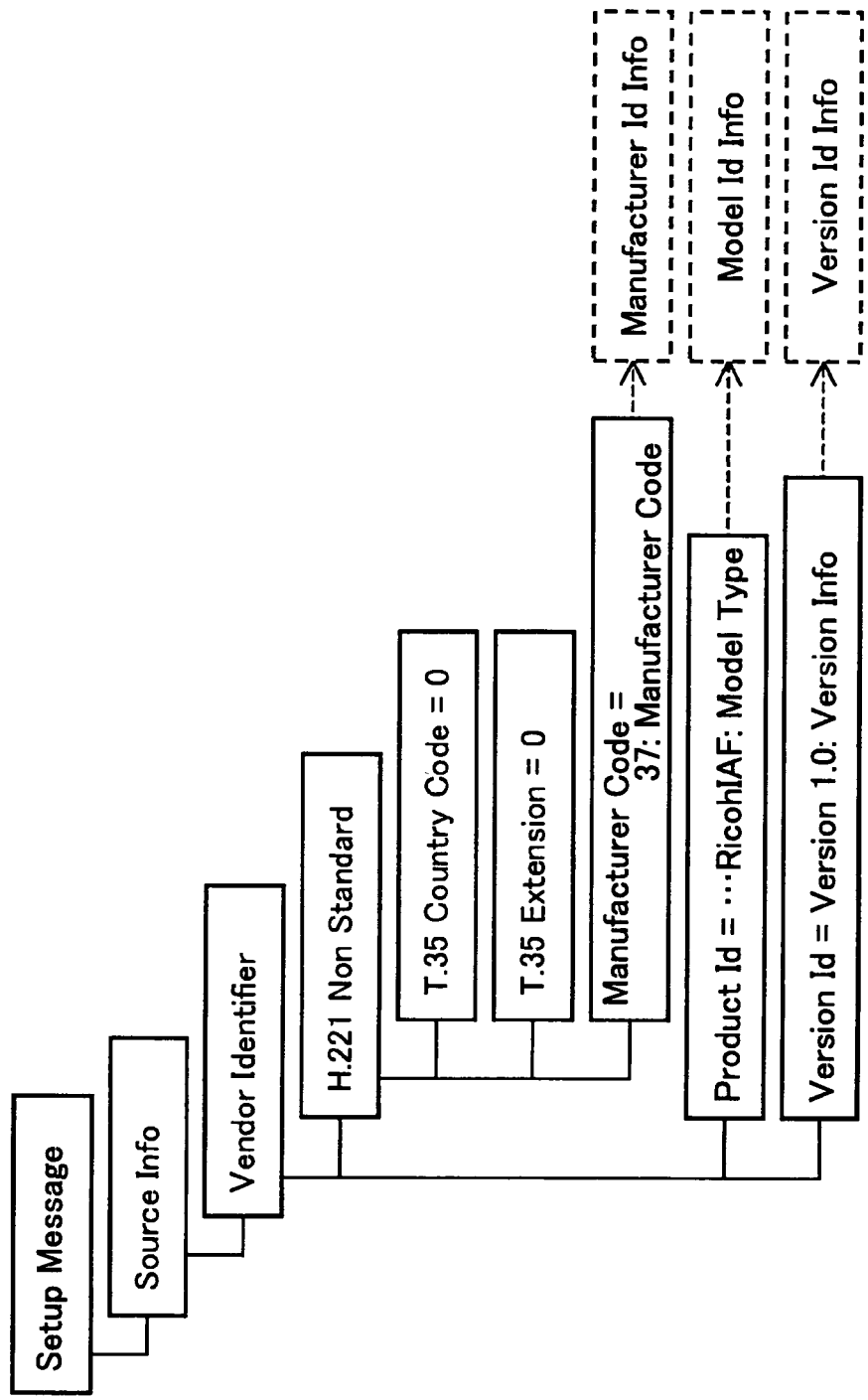
FIG. 7 is a diagram showing other party's attribute information included within a "SETUP" message.
Figure 8:
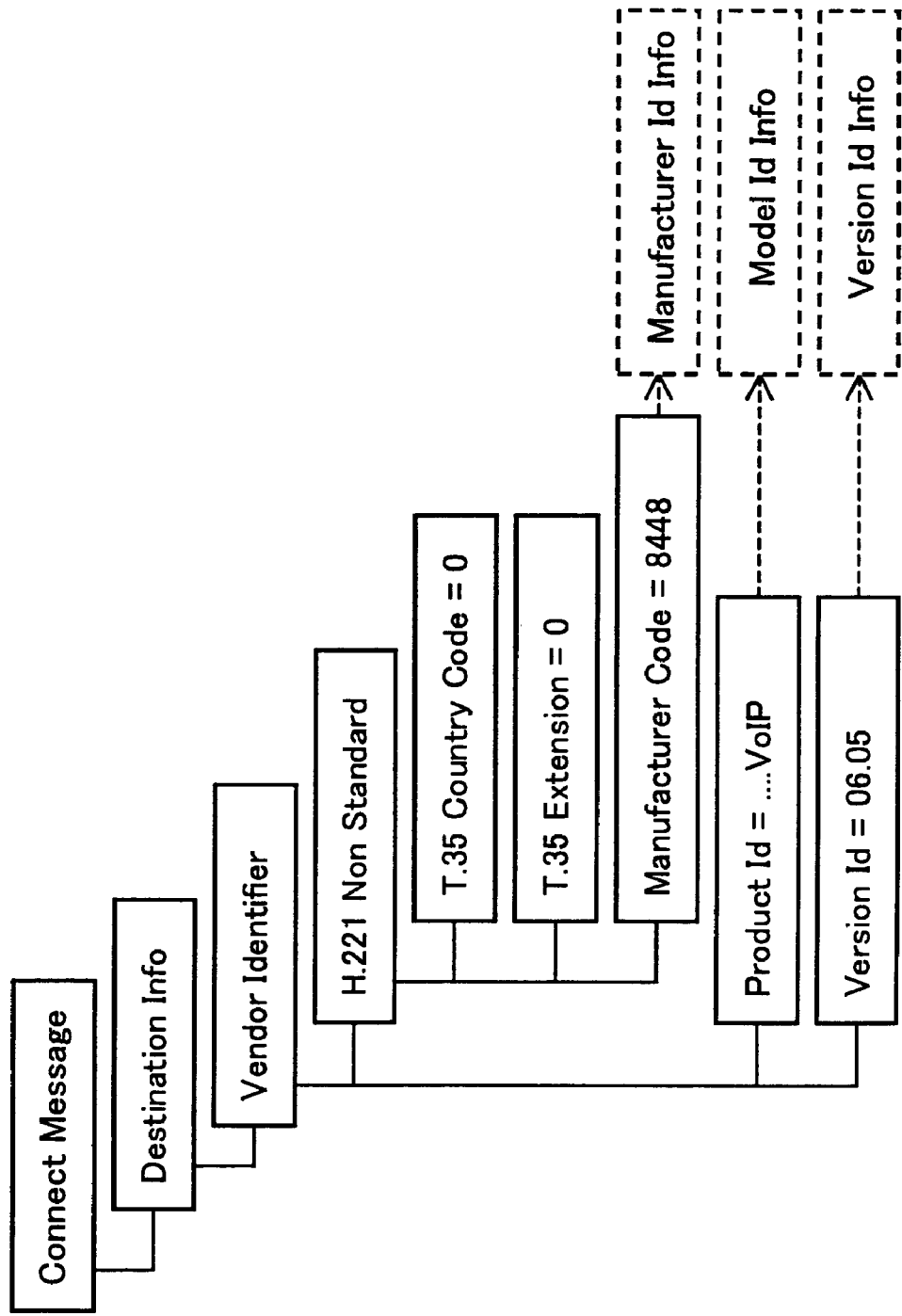
FIG. 8 is a diagram showing other party's attribute information included within a "CONNECT" message.

FIGS. 7 and 8 are diagrams respectively showing the attribute information of the other party's apparatus included in the call connection message. More particularly, FIG. 7 shows the other party's attribute information included within the "SETUP" message, and FIG. 8 shows the other party's attribute information included within the "CONNECT" message.

As may be seen from FIGS. 7 and 8, the attribute information included within the "SETUP" message and the "CONNECT" message have similar data structures. In FIGS. 7 and 8, a "Manufacturer Code" is the information that is compared with the "manufacturer identification information" of the table 5a shown in FIG. 4, a "Product Id" is the information that is compared with the "model identification information" of the table 5a shown in FIG. 4, and a "Version Id" is the information that is compared with the "version identification information" of the table 5a shown in FIG. 4.

When the communication apparatus 1 functions as the sending end, the "other party's attribute information" can be acquired from the "CONNECT" message. On the other hand, when the communication apparatus 1 functions as the receiving end, the "other party's attribute information" can be acquired from the "SETUP" message.

Figure 9:
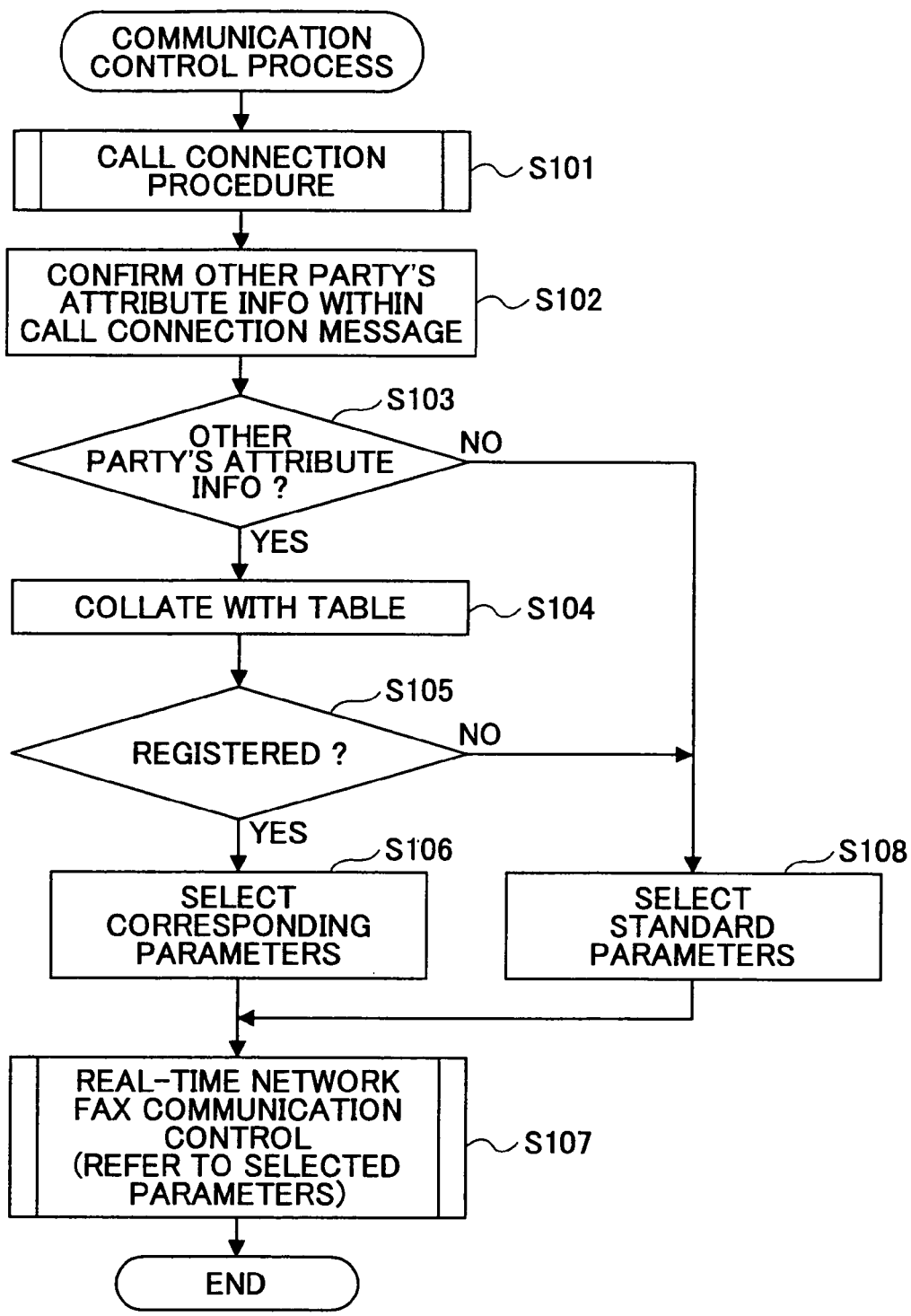
FIG. 9 is a flow chart for explaining a communication control procedure related to the real-time network facsimile communication carried out by the communication apparatus of the embodiment.

FIG. 9 is a flow chart for explaining a communication control procedure related to the real-time network facsimile communication carried out by the communication apparatus 1 of this embodiment. The communication control procedure shown in FIG. 9 includes a processing procedure corresponding to an other party's attribute information acquiring part or means and a communication control part or means.

In FIG. 9, a call connection procedure corresponding to the phase F0 shown in FIG. 6 is carried out in a step S101. The "other party's attribute information" within the call connection message, that is, the "SETUP" message or the "CONNECT" message, received from the other party's apparatus by the call connection process, is confirmed in a step S102.

If the "other party's attribute information" cannot be acquired and the judgement result in a step S103 is NO, the standard "communication control parameters" are selected in a step S108, and the process advances to a step S107. The standard "communication control parameters" are selected by selecting the "communication control parameters" for the "management number" that is "0" in the table 5a shown in FIG. 4.

On the other hand, if the "other party's attribute information" can be acquired and the judgement result in the step S103 is YES, the acquired "other party's attribute information" is collated with the records for the "management number" that is "1" or greater in the table 5a shown in FIG. 4 in a step S104, so as to judge whether or not there exist records (specified by the "management number") that are registered with the corresponding "other party's attribute information" in a step S105.

If the judgement result in the step S105 is NO, the process advances to the step S108 so as to select the standard "communication control parameters" by selecting the "communication control parameters" for the "management number" that is "0" in the table 5a shown in FIG. 4. The process advances to the step S107 after the step S108.

On the other hand, if the judgement result in the step S105 is YES, the corresponding "communication control parameters" are selected in a step S106, and the process advances to the step S107.

In the step S107, the real-time network facsimile communication is controlled by a control operation (corresponding to the phase F4 and the subsequent phases shown in FIGS. 6A and 6B) by referring to the standard "communication control parameters" selected in the step S108 or the "communication control parameters" corresponding to the acquired "other party's attribute information" and selected in the step S106.

Accordingly, in the real-time network facsimile communication with the other party's apparatus for which the "other party's attribute information" could not be acquired, the standard real-time network facsimile communication control is carried out by referring to the standard "communication control parameters". On the other hand, in the real-time network facsimile communication with the other party's apparatus for which the "other party's attribute information" is acquired and the corresponding "communication control parameters" are registered in advance, and there is a possibility that the communication with the other party's apparatus may not be carried out positively by the standard real-time network facsimile communication control, the real-time network facsimile communication control appropriately corresponding to the other party's apparatus is carried out by referring to the corresponding optimum "communication control parameters" for the other party's apparatus that are registered.

More particularly, the real-time network facsimile communication between the communication apparatus and the other party's apparatus can be controlled by an optimum real-time network facsimile communication control which sets the "communication control parameters" such as the packet sending interval, the sending packet length, the sending packet type and the preamble packet addition to optimum values (or settings) for the other party's apparatus. Therefore, it is possible to always realize an optimum real-time network facsimile communication regardless of the "other party's attribute information" related to the manufacturer, the model, the version of the communication control program and the like.

In the embodiment described heretofore, it is assumed for the sake of convenience that the communication apparatus 1 acquires the "other party's attribute information" by the call connection procedure based on the H.323 protocol. However, as will be described hereunder in conjunction with FIGS. 10A and 10B, the present invention is also applicable to a case where the communication apparatus 1 establishes a session by exchanging Session Initiation Protocol (SIP) messages with the other party's apparatus, and carries out a Voice over IP (VoIP) communication with the other party's apparatus based on the Recommendations T.38.

Figure 10A:
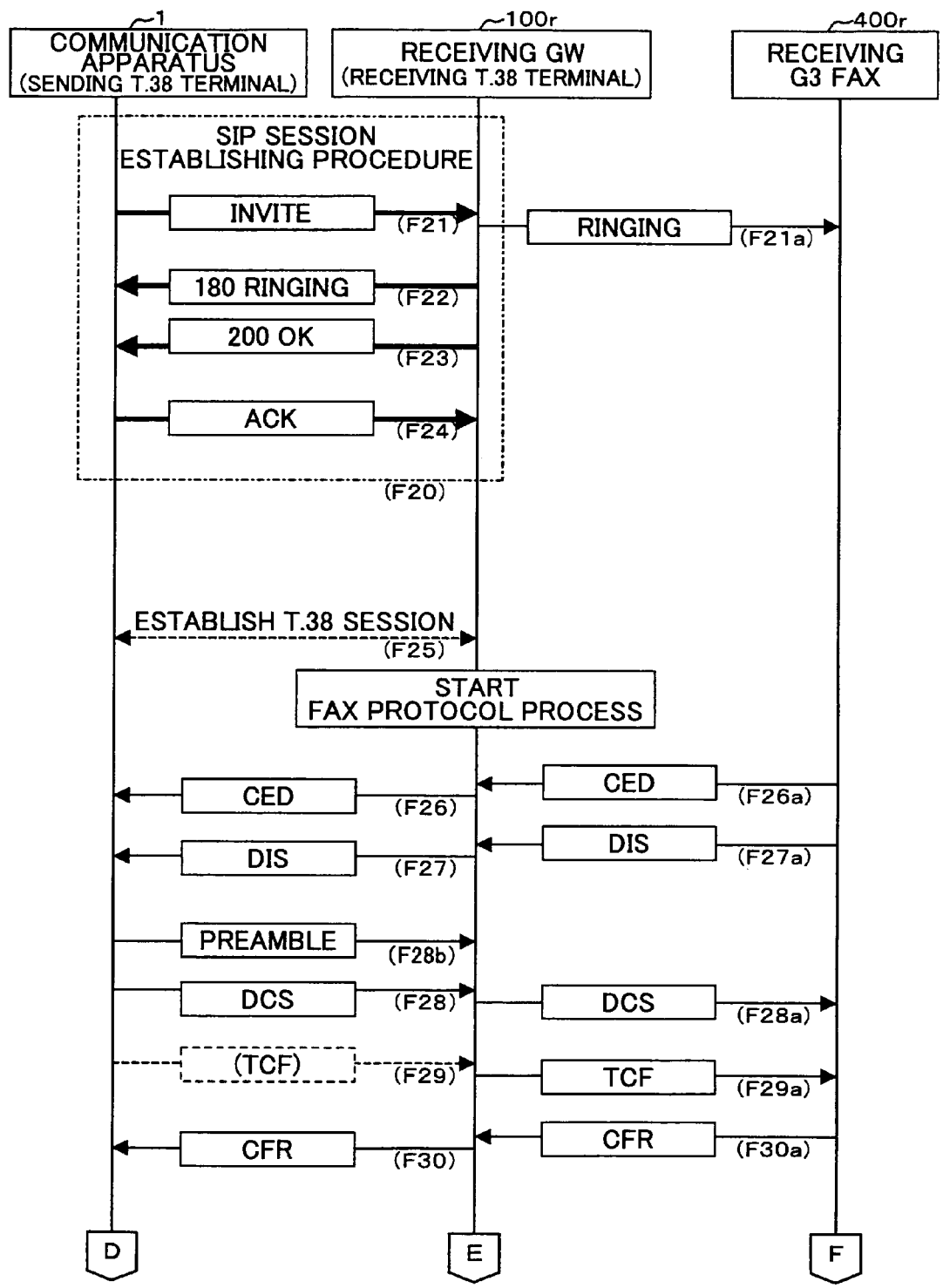
FIGS. 10A and 10B are sequence diagrams respectively showing a communication sequence for the case shown in FIG. 5 where the communication apparatus is applied to the sending IAF shown in FIG. 1 and the real-time network facsimile communication is to be made with the receiving facsimile apparatus in the telephone network via the receiving gate way.
Figure 10B:
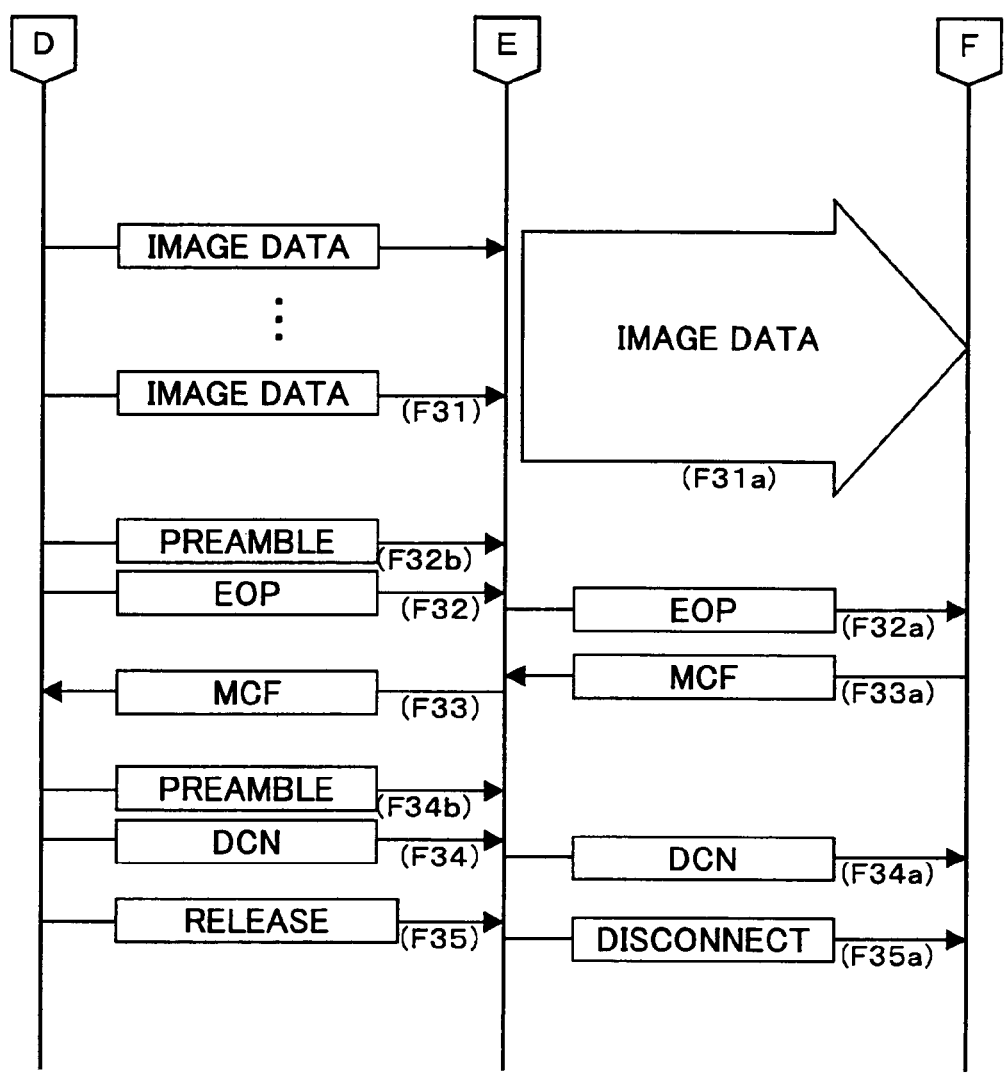

FIGS. 10A and 10B are sequence diagrams respectively showing a communication sequence for the case shown in FIG. 5 where the communication apparatus 1 is applied to the sending IAF 200a shown in FIG. 1 and the real-time network facsimile communication is to be made with the receiving facsimile apparatus 400r in the telephone network 500r via the receiving GW 100r.

First, in FIG. 10A, the communication apparatus 1 which functions as the sending T.38 terminal sends an "INVITE" request which is one of the SIP messages with respect to the GW 100r which functions as the receiving T.38 terminal, based on the SIP (phase F21). In response to the "INVITE" request, the receiving GW 100r rings the receiving G3 facsimile apparatus 400r via the telephone network 500r (phase F21a). The receiving G3 facsimile apparatus 400r will respond at an arbitrary time to the ringing from the receiving GW 100r, and the receiving GW 100r and the receiving G3 facsimile apparatus 400r will be connected by a line via the telephone network 500r.

In response to the "INVITE" request received in the phase D21, the receiving G3 facsimile apparatus 400r returns a provisional response "180 Ringing" (phase F22), followed by a final response "200 OK" (phase F23), and the sending communication apparatus 1 sends an "ACK" request (phase F24).

An SIP session establishing procedure (phase F20) is carried out by the exchange of the SIP messages in the phases F21 through F24, and the T.38 session is established between the sending communication apparatus 1 and the receiving GW 100r. The G3 facsimile communication that is established between the receiving GW 100r and the receiving G3 facsimile apparatus 400r is not directly related to the sending communication apparatus 1. However, the control signals and data based on the ITU-T Recommendations T.30 that are exchanged between the receiving GW 100r and the receiving G3 facsimile apparatus 400r and the packets are mutually converted in real-time, so that the sending communication apparatus 1 and the receiving G3 facsimile apparatus 400r indirectly carry out the real-time facsimile communication.

In other words, a called station identification signal CED which is sent from the receiving G3 facsimile apparatus 400r as the modem signal (phase F26a) is converted into CED packets by the receiving GW 100r and sent to the sending communication apparatus 1 (phase F26). In addition, when a digital identification signal DIS is sent from the receiving G3 facsimile apparatus 400r as the modem signal following the called station identification signal CED (phase F27a), the receiving GW 100r converts the digital identification signal DIS into DIS packets and sends the DIS packets to the sending communication apparatus 1 (phase F27).

On the other hand, the sending communication apparatus 1 sends at least one packet of the digital send command signal DCS (DCS packet) which is one of the control signals (phase F28). Prior to sending the DCS packet, the sending communication apparatus 1 sends at least one preamble packet to the receiving GW 100r (phase F28b). According to the T.30 communication procedure using the modem signal via the telephone network, the preamble signal is actually send prior to sending each control signal. But according to the real-time network facsimile communication based on T.38 in the packet network, it is meaningless to exchange the digital data corresponding to the preamble signal, and thus, a packet containing information which simply indicates that "this packet is a preamble packet" is sent as the preamble packet. The preamble packet may also be added to the DIS packets and the like that are sent from the receiving GW 100r to the sending communication apparatus 1.

The DCS packets sent in the phase F28 are converted into the modem signal by the receiving GW 100r and sent to the receiving G3 facsimile apparatus 400r (phase F28a).

In addition, the sending communication apparatus 1 sends at least one packet of a training check signal TCF (TCF packet) following the DIS packets to the receiving GW 100r (phase F29). A packet containing information which simply indicates that "this packet is a TCF packet" may be sent as the TCF packet. Since it is meaningless to exchange the digital data corresponding to the training check signal TCF in the packet communication, the sending of the training check signal TCF may be omitted.

After sending the digital send command signal DCS in the phase F28a, the receiving GW 100r sends the training check signal TCF to the receiving G3 facsimile apparatus 400r (phase F29a). The receiving G3 facsimile apparatus 400r trains the modem thereof based on the training check signal TCF that is received in the phase F29a, and sends a reception preparation confirmation signal CFR to the receiving GW 100r when the training is completed (phase F30a). Responsive to the reception preparation confirmation signal CFR, the receiving GW 100r sends at least one packet of the reception preparation confirmation signal CFR (CFR packet) to the sending communication apparatus 1 (phase F30).

The pre-transmission procedure prior to the start of sending of the image data is completed by the phases shown in FIG. 10A described above, and the communication sequence advances to the phases shown in FIG. 10B. The packets of the image data are successively sent from the sending communication apparatus 1 to the receiving GW 100r (phase F31). The receiving GW 100r converts the packets of the image data successively received from the sending communication apparatus 1 into the signals of the image data in conformance with Recommendations T.30, and sends the signals of the image data to the receiving G3 facsimile apparatus 400r (phase F31a).

When the sending of the image data is completed, the sending communication apparatus 1 sends at least one packet of an end of procedure signal EOP (EOP packet) to the receiving GW 100r (phase F32). Prior to sending the EOP packet, the sending communication apparatus 1 sends at least one preamble packet to the receiving GW 100r (phase F32b). When the receiving GW 100r receives the EOP packet in the phase F32, the receiving GW 100r sends a modem signal of the end of procedure signal EOP to the receiving G3 facsimile apparatus 400r (phase F32a). In addition, when the receiving GW 100r receives a modem signal of a message confirmation signal MCF from the receiving G3 facsimile apparatus 400r (phase F33a), the receiving GW 100r sends at least one packet of the message confirmation signal MCF (MCF packet) to the sending communication apparatus 1 (phase F33).

When the sending communication apparatus 1 receives the MCF packet in the phase F33, the sending communication apparatus 1 sends at least one packet of a disconnect command signal DCN (DCN packet) to the receiving GW 100r (phase F34). Prior to sending the DCN packet, the sending communication apparatus 1 sends at least one preamble packet to the receiving GW 100r (phase F34b). When the receiving GW 100r receives the DCN packet in the phase F34, the receiving GW 100r sends a modem signal of the disconnect command signal DCN to the receiving G3 facsimile apparatus 400r (phase F34a).

Finally, the sending communication apparatus 1 sends a "Release" message to the receiving GW 100r (phase F35). In response to the "Release" message from the sending communication apparatus 1, the receiving GW 100r disconnects the line connected between the receiving GW 100r and the receiving G3 facsimile apparatus 400r (phase F35a), and the relay operation of the real-time network facsimile communication is completed.

In the communication sequence described above with reference to FIGS. 10A and 10B, the exchange of the packets related to the real-time network facsimile communication between the communication apparatus 1 which functions as the sending T.38 terminal and the GW 100r which functions as the receiving T.38 terminal is made based on the ITU-T Recommendations T.38. However, the interpretation of the ITU-T Recommendations T.38 by the manufacturer of the GW 100r and the interpretation of the ITU-T Recommendations T.38 by the manufacturer of the communication apparatus 1 may be slightly different. As a result, when the standard real-time network facsimile communication is controlled by referring to the standard communication control parameters corresponding to the "management number" that is "0" in the table 5a shown in FIG. 4 at the communication apparatus 1 which functions as the sending T.38 terminal, it may not be possible to carry out a normal communication with the GW 100r which functions as the receiving T.38 terminal due to such slight differences in the interpretations of the ITU-T Recommendations T.38 and various other causes.

Such a problem is not limited to the case shown in FIG. 5 where the communication apparatus 1 is used as the sending IAF 200s, and similar problems occur in cases where the communication apparatus 1 is used as the sending GW 100s in FIG. 1, used as the receiving IAF 200r in FIG. 1, and used as the receiving GW 100r in FIG. 1.

More particularly, such problems occur when the packet sending interval of the communication apparatus is too short for the other party's apparatus to cope with, when the preamble packet sent from the communication apparatus cannot be processed correctly in the other party's apparatus, when the size of the packet sent from the communication apparatus is too large for the other party's apparatus to process the packet in a normal manner, and when it is not possible to determine whether the exchange of the DIS and DSC or the exchange of the NSF or DIS and NSS is the appropriate packet type for the sending packet.

Accordingly, this embodiment carries out an optimum control of the real-time network facsimile communication by utilizing the attribute information of the other party's apparatus that may be included, as information of the SIP message, in the "INVITE" request (phase F21), the "180 Ringing" response (phase F22), the "200 OK" response (phase F23) or the "ACK" request (phase F24) that is exchanged in the SIP session establishing procedure of the phase F20.

The SIP message such as the "INVITE" request exchanges various information with the other party's apparatus by various header information and a Session Description Protocol (SDP) within a body portion of the message. FIGS. 11 and 12 are diagrams for explaining a field group for representing the attribute information and the like of the apparatus by an SDP description within the SIP message, and a description of the fields for the case shown in FIG. 11.

FIG. 11 shows the field group for representing the attribute information and the like of the apparatus by the SDP description within the SIP message. As shown in FIG. 11, optional attribute field names include "T35 Country Code", "T35 Extension" and "Manufacturer Code". Character strings written in the attribute field include "T35CountryCode", "T35Extension" and "ManufacturerCode" for the three corresponding optional attribute field names. In addition, values "0 to 255", "0 to 255" and "0 to 65535" are set for the three corresponding optional attribute field names.

FIG. 12 shows the description of the fields in SDP within the SIP message, for the case shown in FIG. 11. As shown in FIG. 12, the corresponding "character string" follows "a=" which indicates the "attribute", and the "value" follows a colon ":" inserted after the "character string".

a=CountryCode: 0
a=T35Extension: 0
a=ManufacturerCode: 37

By including the attribute information of a first apparatus as the information within the SIP message, when viewed from a second apparatus which communicates with the first apparatus, this second apparatus can obtain the attribute information of the first apparatus, that is, the other party's attribute information, during the SIP session establishing procedure.

Figure 14:
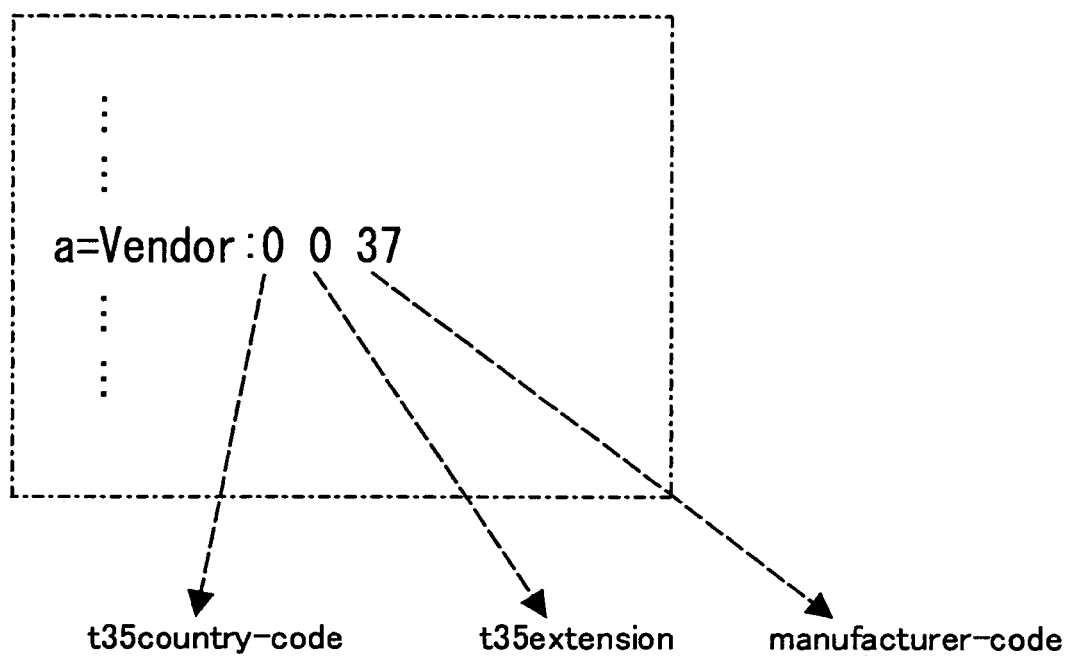
FIG. 14 is a diagram showing a description of fields in SDP within the SIP message, for the case shown in FIG. 13.

FIGS. 13 and 14 are diagrams for explaining another field group for representing the attribute information and the like of the apparatus by the SDP description within the SIP message, and a description of the fields for the case shown in FIG. 13.

FIG. 13 shows the other field group for representing the attribute information and the like of the apparatus by the SDP description within the SIP message. As shown in FIG. 13, an optional attribute field name includes "Vendor", and a character string written in the attribute field includes "Vendor". In addition, values "0 to 255" meaning "t35country-code", values "0 to 255" meaning "t35extension" and values "0 to 65535" meaning "manufacturer-code" are set for the corresponding optional attribute field name "Vendor".

FIG. 14 shows the description of the field in SDP within the SIP message, for the case shown in FIG. 13. As shown in FIG. 14, the corresponding "character string" follows "a=" which indicates the "attribute", and the "value" follows a colon ":" inserted after the "character string".

a=Vendor:0 0 37

In this particular case, the numerical string "0 0 37" is made up of "0", "0" and "37" that are separated by spaces. The first "0" means "t35country-code", the second "0" means "t35extension", and the last "37" means "manufacturer-code".

The attribute information of the apparatus is not limited to the SDP description in the message body portion within the SIP message. For example, it is possible to include the "attribute information" indicating "SIPGateway" manufactured by "abcde" company, by writing "User-Agent: abcde-SIPGateway/ . . . " as contents of "User-Agent:" which is one of the header information, together with "Via:", "To:" and the like. Furthermore, it is possible to include detailed information, such as the model identification information and the version identification information of the software, after "/". Such description methods are not SIP standard, but may be employed if the interpretation of the contents of the "User-Agent:" is agreed upon in advance between the communication apparatus 1 which carries out the real-time network facsimile communication control depending on the other party's identification information and the apparatus (including those manufactured by a manufacturer other than the manufacturer of the communication apparatus 1) which may be used as the other party's apparatus. The same holds true for the attribute field ("a=") that is written in SDP in the message body portion.

By including the attribute information of a first apparatus as the information within the SIP message, when viewed from a second apparatus which communicates with the first apparatus, this second apparatus can obtain the attribute information of the first apparatus, that is, the other party's attribute information, during the SIP session establishing procedure.

Therefore, by preparing in advance the table 5a shown in FIG. 4 in which the other party's attribute information and the communication control parameters are preset and prestored, in correspondence with the other party's attribute information that can be acquired by the communication apparatus 1 from the other party's apparatus, it is possible to carry out the real-time network facsimile communication based on the Recommendations T.38 by the settings dependent on the other party's attribute information obtained during the SIP session establishing procedure.

When the communication apparatus 1 functions as the sending end, it is possible to acquire the other party's attribute information by the "180 Ringing" response (phase F22) or the "200 OK" response (phase F23). On the other hand, when the communication apparatus 1 functions as the receiving end, it is possible to acquire the other party's attribute information by the "INVITE" request (phase F21) or the "ACK" request (phase F24).

Figure 15:
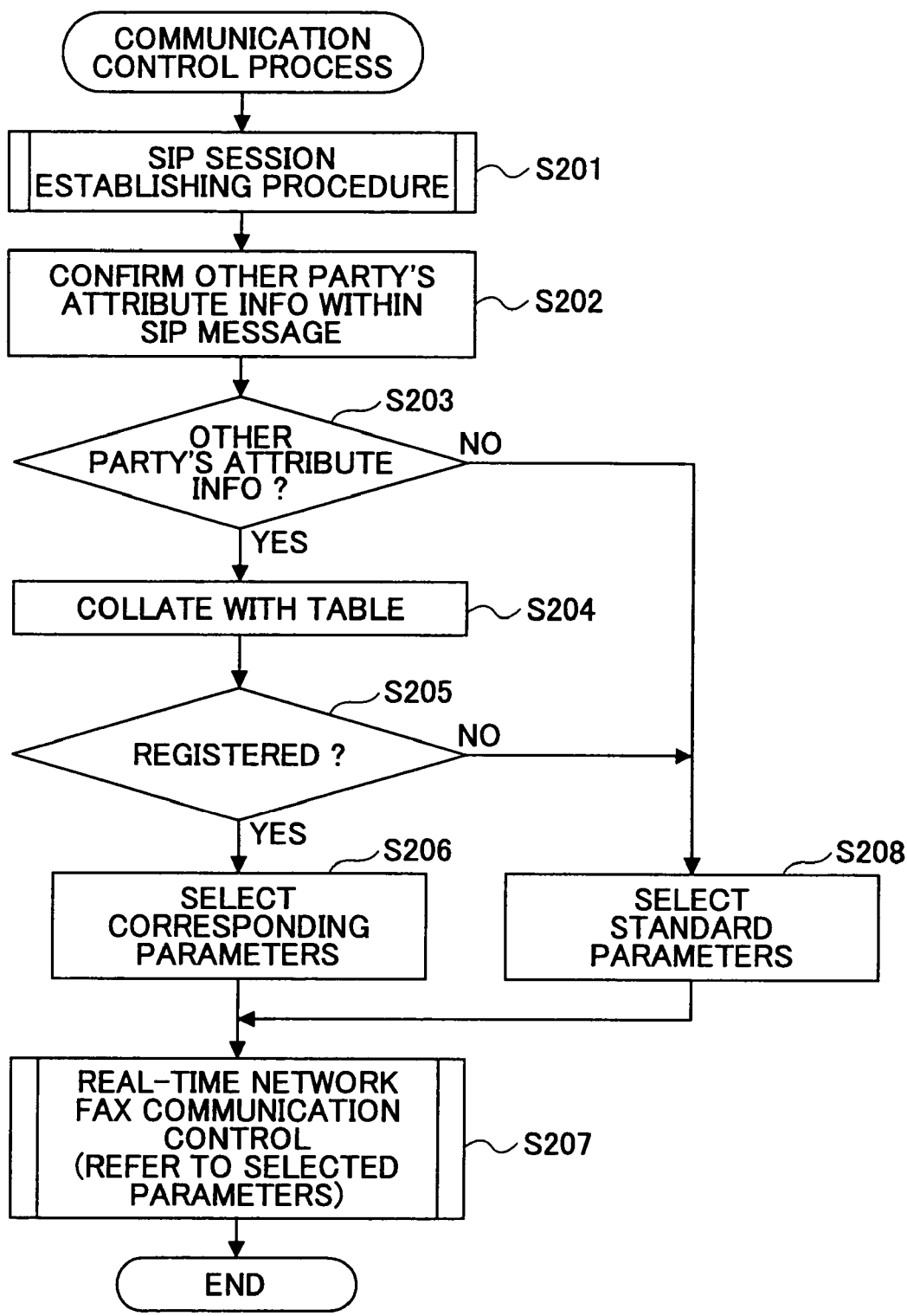
FIG. 15 is a flow chart for explaining a communication control procedure related to the real-time network facsimile communication carried out by the communication apparatus of the embodiment.

FIG. 15 is a flow chart for explaining a communication control procedure related to the real-time network facsimile communication carried out by the communication apparatus of the embodiment. The communication control procedure shown in FIG. 15 includes a processing procedure corresponding to the other party's attribute information acquiring part or means and the communication control part or means.

In FIG. 15, an SIP session establishing procedure corresponding to the phase F20 shown in FIG. 10A is carried out in a step S201, and the "other party's attribute information" within the SIP message received from the other party's apparatus by the call connection process is confirmed in a step S202.

If the "other party's attribute information" cannot be acquired and a judgement result in a step S203 is NO, the standard "communication control parameters" are selected in a step S208, and the process advances to a step S207. The standard "communication control parameters" are selected by selecting the "communication control parameters" for the "management number" that is "0" in the table 5a shown in FIG. 4.

On the other hand, if the "other party's attribute information" can be acquired and the judgement result in the step S203 is YES, the acquired "other party's attribute information" is collated with the records for the "management number" that is "1" or greater in the table 5a shown in FIG. 4 in a step S204, so as to judge whether or not there exist records (specified by the "management number") that are registered with the corresponding "other party's attribute information" in a step S205.

If the judgement result in the step S205 is NO, the process advances to the step S208 so as to select the standard "communication control parameters" by selecting the "communication control parameters" for the "management number" that is "0" in the table 5a shown in FIG. 4. The process advances to the step S207 after the step S208.

On the other hand, if the judgement result in the step S205 is YES, the corresponding "communication control parameters" are selected in a step S206, and the process advances to the step S207.

In the step S207, the real-time network facsimile communication is controlled by a control operation (corresponding to the phase F26 and the subsequent phases shown in FIGS. 10A and 10B) by referring to the standard "communication control parameters" selected in the step S208 or the "communication control parameters" corresponding to the acquired "other party's attribute information" and selected in the step S206.

Accordingly, in the real-time network facsimile communication with the other party's apparatus for which the "other party's attribute information" could not be acquired, the standard real-time network facsimile communication control is carried out by referring to the standard "communication control parameters". On the other hand, in the real-time network facsimile communication with the other party's apparatus for which the "other party's attribute information" is acquired and the corresponding "communication control parameters" are registered in advance, and there is a possibility that the communication with the other party's apparatus may not be carried out positively by the standard real-time network facsimile communication control, the real-time network facsimile communication control appropriately corresponding to the other party's apparatus is carried out by referring to the corresponding optimum "communication control parameters" for the other party's apparatus that are registered.

More particularly, the real-time network facsimile communication between the communication apparatus and the other party's apparatus can be controlled by an optimum real-time network facsimile communication control which sets the "communication control parameters" such as the packet sending interval, the sending packet length, the sending packet type and the preamble packet addition to optimum values (or settings) for the other party's apparatus. Therefore, it is possible to always realize an optimum real-time network facsimile communication regardless of the "other party's attribute information" related to the manufacturer, the model, the version of the communication control program and the like.

This application claims the benefit of Japanese Patent Applications No.2004-077602 filed Mar. 18, 2004 and No.2004-184560 filed Jun. 23, 2004, in the Japanese Patent Office, the disclosure of which is hereby incorporated by reference.

Further, the present invention is not limited to these embodiments, but various variations and modifications may be made without departing from the scope of the present invention.

What is claimed is:

1. A communication apparatus for carrying out a real-time network facsimile communication with a T.38 compatible second apparatus via a packet network based on ITU-T Recommendations T.38, comprising:

an attribute information acquiring part configured to acquire attribute information of the second apparatus that indicates an attribute of the second apparatus from a call connection message that is exchanged with the second apparatus in a predetermined call connection procedure carried out prior to a start of the real-time network facsimile communication, the attribute information of the second apparatus being distinct from the T.38 compatibility of the second apparatus; and a communication control part configured to control the real-time network facsimile communication depending on contents of the attribute information of the second apparatus acquired by the attribute information acquiring part.

2. The communication apparatus as claimed in claim 1, wherein the predetermined call connection procedure is based on H.323 protocol.

3. The communication apparatus as claimed in claim 1, wherein the predetermined call connection procedure is based on Session Initiation Protocol (SIP).

4. The communication apparatus as claimed in claim 1, wherein the attribute information of the second apparatus includes manufacturer identification information that identifies a manufacturer of the second apparatus, and the communication control part controls the real-time network facsimile communication depending on contents of at least the manufacturer identification information of the attribute information of the second apparatus.

5. The communication apparatus as claimed in claim 1, wherein the attribute information of the second apparatus includes model identification information that identifies a model of the second apparatus, and the communication control part controls the real-time network facsimile communication depending on contents of at least the mode identification information of the attribute information of the second apparatus.

6. The communication apparatus as claimed in claim 1, wherein the attribute information of the second apparatus includes version identification information that identifies a version of a communication control program of the second apparatus, and the communication control part controls the real-time network facsimile communication depending on contents of at least the version identification information of the attribute information of the second apparatus.

7. The communication apparatus as claimed in claim 1, wherein the communication control part sets a packet sending interval of packets sent in the real-time network facsimile communication to an interval depending on the attribute information of the second apparatus acquired by the attribute information acquiring part.

8. The communication apparatus as claimed in claim 1, wherein the communication control part sets a sending packet length of packets sent in the real-time network facsimile communication to a length depending on the attribute information of the second apparatus acquired by the attribute information acquiring part.

9. The communication apparatus as claimed in claim 1, wherein the communication control part sets a sending packet type of packets sent in the real-time network facsimile communication to a type depending on the attribute information of the second apparatus acquired by the attribute information acquiring part.

10. The communication apparatus as claimed in claim 1, wherein the communication control part determines whether or not to send a preamble packet prior to sending packets of control signals during the real-time network facsimile communication, depending on the attribute information of the second apparatus acquired by the attribute information acquiring part.

11. A communication control method for controlling a communication apparatus which carries out a real-time network facsimile communication with a T.38 compatible second apparatus via a packet network based on ITU-T Recommendations T.38, said communication method comprising:

an attribute information acquiring step acquiring attribute information of the second apparatus that indicates an attribute of the second apparatus, from a call connection message that is exchanged with the second apparatus in a predetermined call connection procedure carried out prior to a start of the real-time network facsimile communication, the attribute information of the second apparatus being distinct from the T.38 compatibility of the second apparatus; and a communication control step controlling the real-time network facsimile communication depending on contents of the attribute information of the second apparatus acquired by the attribute information acquiring step.

12. The communication control method as claimed in claim 11, wherein the predetermined call connection procedure is based on H.323 protocol.

13. The communication control method as claimed in claim 11, wherein the predetermined call connection procedure is based on Session Initiation Protocol (SIP).

14. The communication control method as claimed in claim 11, wherein the attribute information of the second apparatus includes manufacturer identification information that identifies a manufacturer of the second apparatus, and the communication control step controls the real-time network facsimile communication depending on contents of at least the manufacturer identification information of the attribute information of the second apparatus.

15. The communication control method as claimed in claim 11, wherein the attribute information of the second apparatus includes model identification information that identifies a model of the second apparatus, and the communication control step controls the real-time network facsimile communication depending on contents of at least the mode identification information of the attribute information of the second apparatus.

16. The communication control method as claimed in claim 11, wherein the other party's attribute information includes version identification information that identifies a version of a communication control program of the second apparatus, and the communication control step controls the real-time network facsimile communication depending on contents of at least the version identification information of the attribute information of the second apparatus.

17. The communication control method as claimed in claim 11, wherein the communication control step sets a packet sending interval of packets sent in the real-time network facsimile communication to an interval depending on the attribute information of the second apparatus acquired by the attribute information acquiring step.

18. The communication control method as claimed in claim 11, wherein the communication control step sets a sending packet length of packets sent in the real-time network facsimile communication to a length depending on the attribute information of the second apparatus acquired by the attribute information acquiring step.

19. The communication control method as claimed in claim 11, wherein the communication control step sets a sending packet type of packets sent in the real-time network facsimile communication to a type depending on the attribute information of the second apparatus acquired by the attribute information acquiring step.

20. The communication control method as claimed in claim 11, wherein the communication control step determines whether or not to send a preamble packet prior to sending packets of control signals during the real-time network facsimile communication, depending on the attribute information of the second apparatus acquired by the attribute information acquiring step.

* * * * *